Feb. 6, 1962 A. R. KILMINSTER 3,019,703
PHOTOGRAPHIC COLOUR REPRODUCTION APPARATUS
Filed Sept. 18, 1958 7 Sheets-Sheet 1
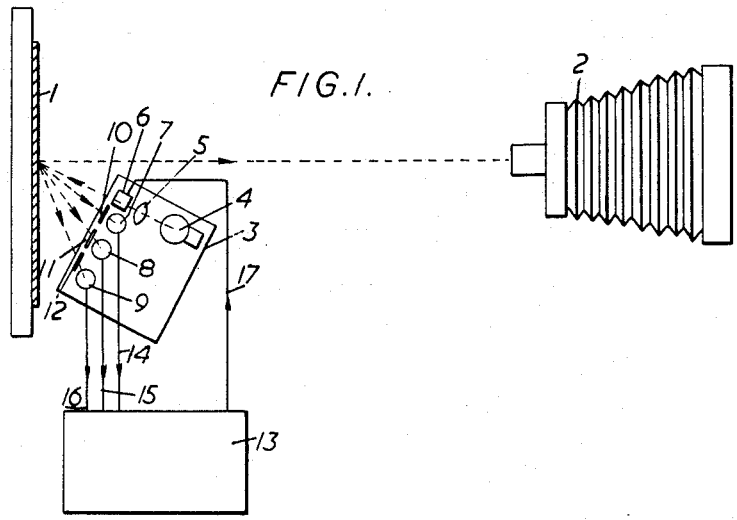
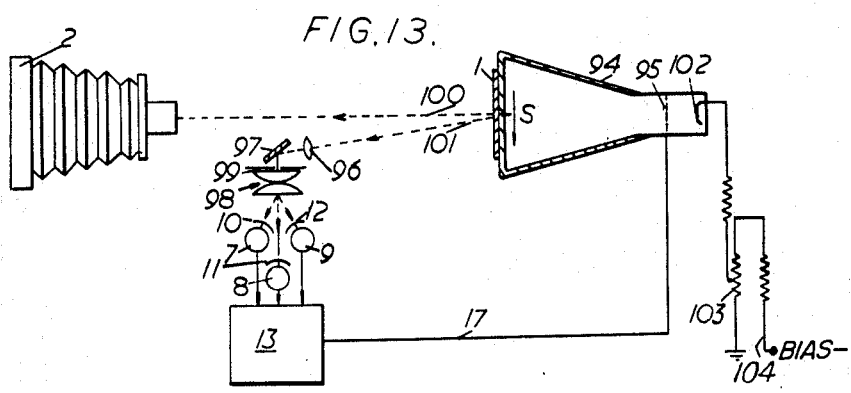
Inventor
ARTHUR R. KILMINSTER
By Imirie & Smiley
Attorneys

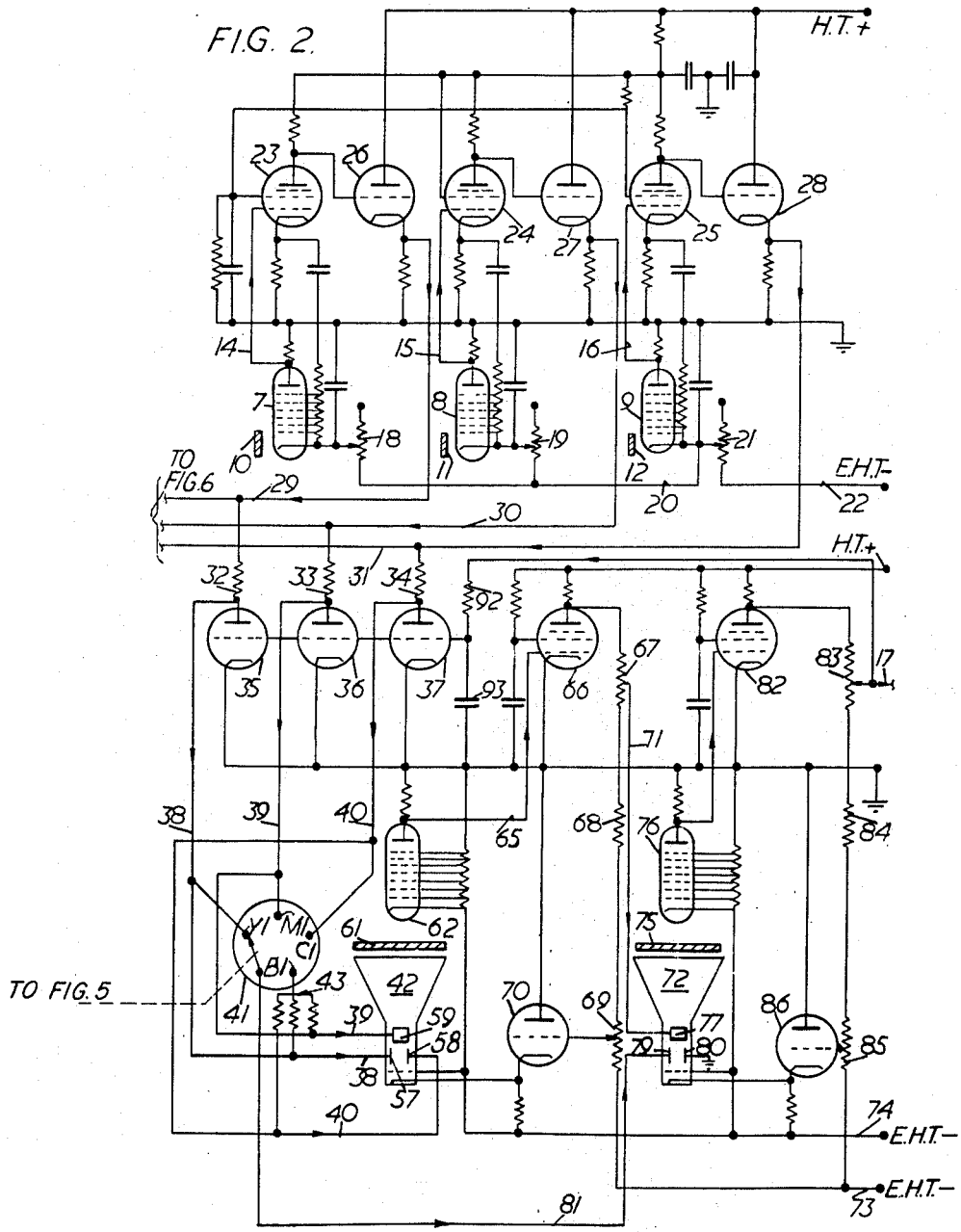

*Inventor*
ARTHUR R. KILMINSTER

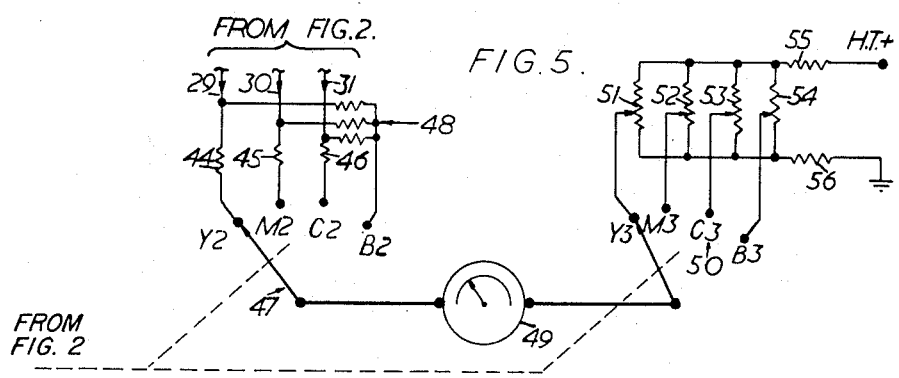
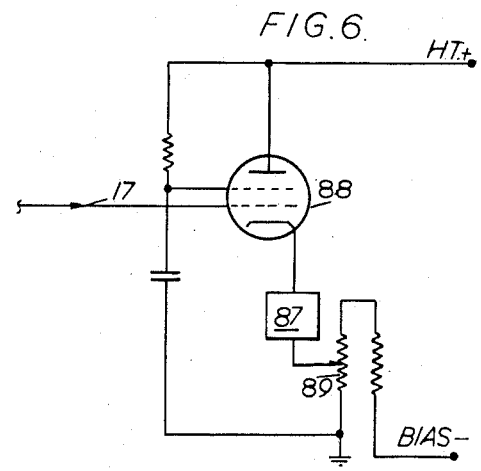

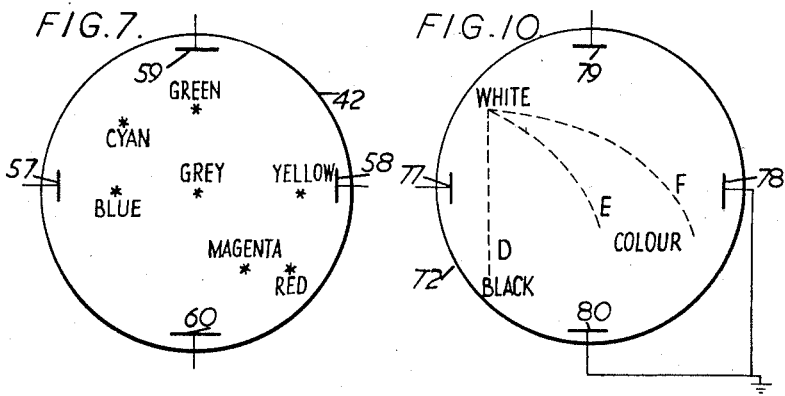
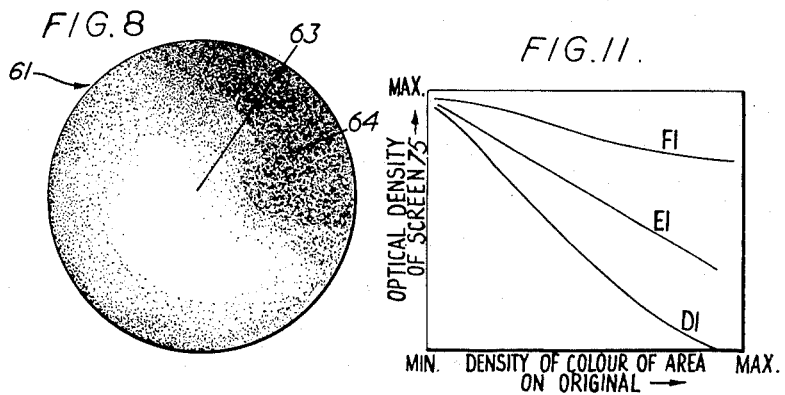
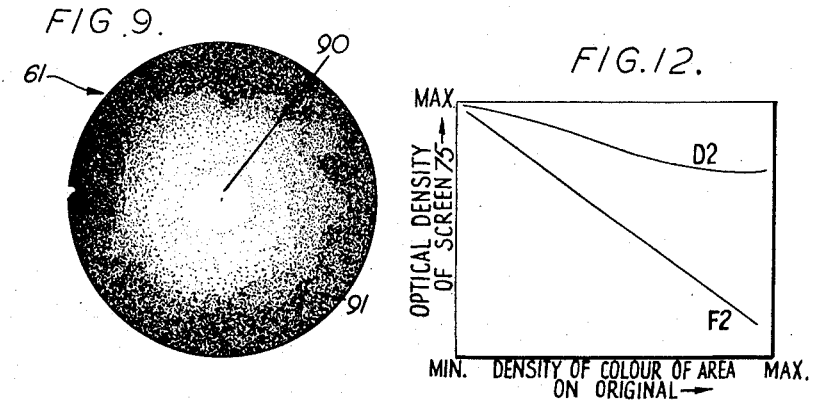

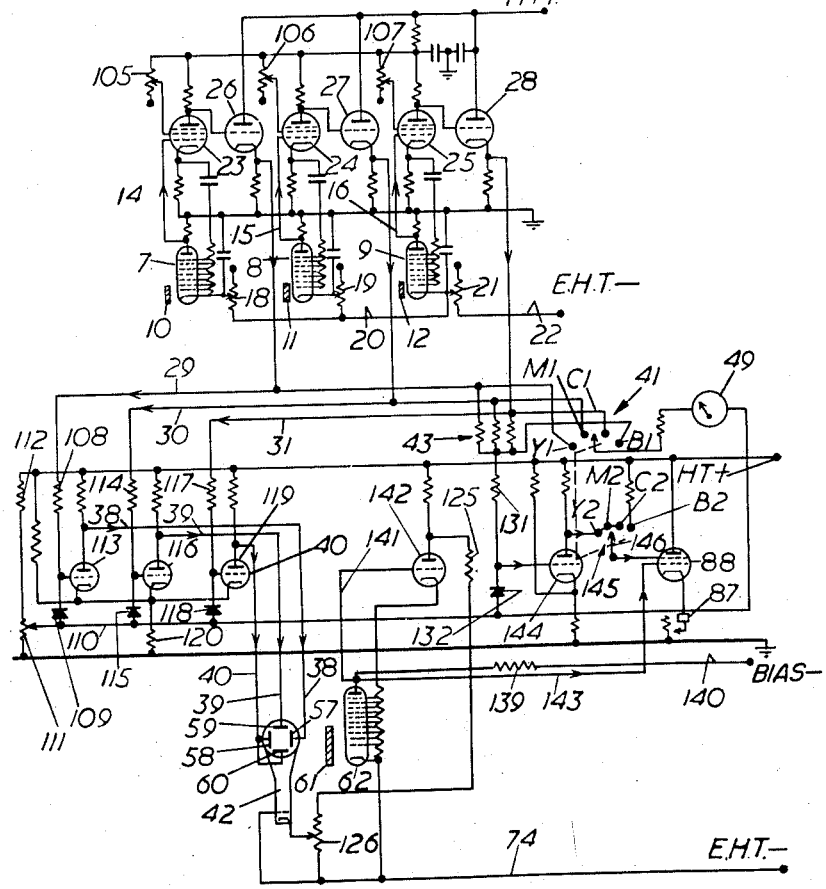

United States Patent Office 3,019,703
Patented Feb. 6, 1962

3,019,703
PHOTOGRAPHIC COLOUR REPRODUCTION APPARATUS
Arthur R. Kilminster, Birmingham, England, assignor to Hunter-Penrose Limited, London, England, a British company
Filed Sept. 18, 1958, Ser. No. 761,879
Claims priority, application Great Britain Sept. 24, 1957
21 Claims. (Cl. 88—24)

This invention relates to photographic colour reproduction apparatus, and in particular to apparatus for use in the preparation of colour separation photographic negatives.

It has been proposed in the preparation of colour separation photographic negatives from an original, which may be an opaque original or a colour transparency to scan the original by means of a scanning spot of light and to expose a photographic plate to light transmitted from the original; each of three photoelectric devices being illuminated by a primary colour component of light transmitted from the original, and a colour and tone correction signal being produced by a computer from electrical signals derived from the photoelectric devices to effect modulation of the intensity of the scanning spot and consequently modulation of the amount of light transmitted from the original to the photographic plate.

In one such prior proposal it has been suggested that the signals from the photoelectric devices be mixed with a signal the purpose and effect of which is to provide for transmission to the computer of signals, which are independent of the brightness of the scanning spot and which are dependent only on the actual density of the original. Apparatus constructed as described herein differs from this prior proposal in that the signals which are received by the computer are all dependent both on the density of the original and on the brightness of the scanning spot.

The term "photographic plate" when used herein is intended to include photographic film.

Figure 3:
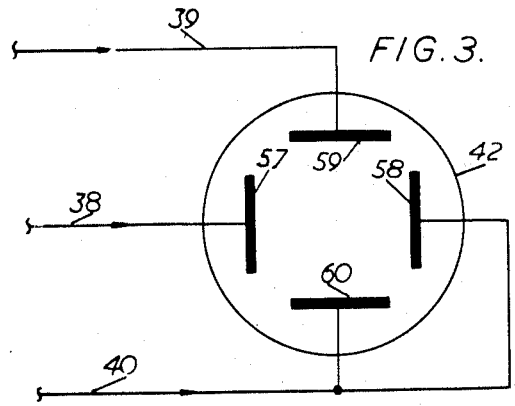
Figure 4:
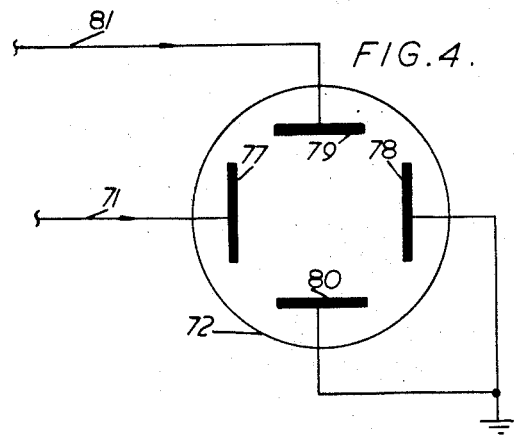
Figure 14:
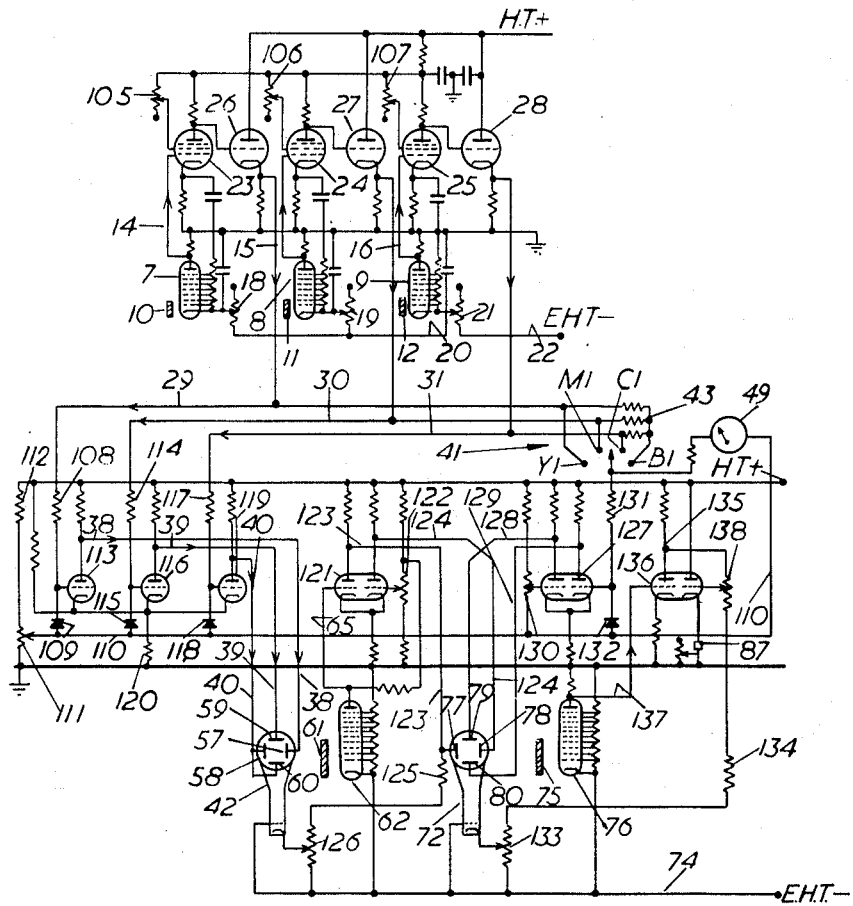

In order that the invention may be clearly understood, some embodiments thereof will now be described, by way of example, with reference to the accompanying diagrammatic drawings, in which:

FIGURE 1 is a schematic illustration of an embodiment of the invention,

FIGURE 2 is a circuit diagram of electronic apparatus for producing a modulating signal, FIGURES 3 and 4 illustrate detailed connections in the circuit diagram of FIGURE 2, FIGURE 5 is the circuit diagram of an indicating device for connection to the circuit of FIGURE 2, FIGURE 6 is the circuit diagram of an intensity modulator, FIGURE 7 illustrates diagrammatically a display on the face of an analysing cathode ray tube, FIGURES 8 and 9 are representations of selecting screens of varying optical density, FIGURE 10 illustrates diagrammatically the display on the face of a correction cathode ray tube, FIGURES 11 and 12 are graphs illustrative of the optical density distribution of correction screens, FIGURE 13 is a schematic illustration of an embodiment of the invention including a cathode ray tube scanning device, FIGURE 14 is a circuit diagram of another electronic apparatus for producing a modulating signal, and FIGURE 15 is a simplified version of the circuit of FIGURE 14.

In the drawings like reference numerals indicate the same or similar parts.

Referring to FIGURE 1 of the drawings, a coloured original 1, which is opaque, and which may be a watercolour, an oil colour or a coloured print, is rigidly supported in any suitable manner, as for example by a rigid frame extending upwards from a base plate or the like, not shown, on which is also mounted a camera 2. A photographic plate is supported in known manner in the camera 2, to be exposed to light transmitted directly from the original 1.

The original 1 is sequentially scanned by scanning means 3 operable to direct a spot of substantially white light on to the original and which includes for this purpose a suitable source of light 4, such as an electric lamp of suitable intensity, or a gas-filled arc discharge lamp which emits light of suitable spectral composition. In FIGURE 1 the source of light 4 is assumed to be an electric lamp, and the source co-operates with an optical system comprising a condensing lens 5 and an electrically actuated modulating means, shown as an intensity modulator 6, which is operable to vary the intensity of the scanning spot and which may comprise a light valve such as a double ribbon galvanometer in which the shape of a slot between two ribbons is varied, or a mirror galvanometer in which a mirror is deflected to reflect a variable amount of light on to the original, operated by a driver valve as described herein with reference to FIG. 6, to vary the intensity of the spot of light directed on to the original.

The scanning means 3 is supported from the base plate by any suitable means, not shown, and is provided with a suitable mechanism, also not shown, by which the scanning means 3 is moved relative to the original 1 in both horizontal and vertical directions to cause the spot of light from the source 4 to effect sequential scanning of the original. The movement of the scanning spot of light is synchronised with the operation of the shutter of the camera 2, and the scanning means 3 is maintained spaced from the original 1 by a fixed distance, so that the scanning spot is always focussed on to the original.

Light which is transmitted from the original 1 falls on three photoelectric devices shown as a first, a second and a third photomultiplier tube 7, 8 and 9, which have respectively associated therewith a blue filter 10, a green filter 11 and a red filter 12. Light transmitted from the original passes through the filters to actuate the photomultiplier tubes, so that each tube receives a light signal representative of a primary colour component of the original, and which is a function of the intensity of the light source and of the density of the area of the original from which light is transmitted. It will be understood that if desired the photoelectric devices may be other than photomultiplier tubes, for example, they may be phototransistors.

The output signals originating from the photomultiplier tubes are transmitted directly and without modification to a control means 13 on lines 14, 15 and 16, and the control means 13, which includes a colour analysing device and correction means, is operable to produce from the output signals a modulating signal, being a colour and tone corrected signal which is transmitted to the intensity modulator 6 on line 17 to vary the intensity of the scanning spot thereby to modify the light response from an area on the original which is recorded on the photographic plate in the camera 2.

In a three colour printing process employing yellow, magenta and cyan printing inks, a corrected colour separation photographic negative for use in the preparation of a plate for printing with yellow ink, hereinafter referred to as the "yellow printer," is produced by exposing a photographic plate in the camera 2 through a blue filter, with the control means 13 producing a yellow colour and tone corrected modulating signal for transmission on line 17. Similarly to produce corrected colour separation photographic negatives for use in the preparation of plates for printing with magenta and cyan inks, hereinafter referred to as the "magenta printer" and the "cyan printer," green and red filters respectively are used with the camera 2 and the control means 13 produces magenta and cyan colour and tone corrected modulating signals for transmission on line 17.

In a four colour printing process a corrected colour separation photographic negative for use in the preparation of a plate for printing with black ink, hereinafter referred to as the "black printer," is also required, and the control means 13 then operates to produce a black colour and tone corrected modulating signal.

The circuit diagram of the electronic apparatus for producing the yellow, magenta, cyan and black colour and tone corrected modulating signals, and which includes the photomultiplier tubes 7, 8 and 9, and the control means 13, is illustrated in FIGURES 2, 3, 4, 5 and 6. Referring to FIGURES 2, 3 and 4 light transmitted from the original is incident through the filters 10, 11 and 12 on the cathodes of the photomultiplier tubes 7, 8 and 9. The anode of each photomultiplier tube is connected to earth through a resistor. The cathodes of tubes 7 and 8 are connected to variable resistors 18 and 19 which are connected to a line 20 which is connected to the cathode of tube 9 and through a variable resistor 21 to a source of negative E.H.T. potential on line 22. The variable resistors 18, 19 and 21 are connected for initial adjustment of the negative E.H.T. potential on the cathodes of the photomultiplier tubes 7, 8 and 9, and are used to preset the potentials applied to the photomultiplier tubes to obtain an initial condition of balance thereof to correct the background tones of a paper on which printing is to be effected. This initial condition of balance is attained when the tubes 7, 8 and 9 give equal signals when they are activated by light transmitted from the paper which is substituted for the original.

The output signals originating from the first, the second and third photomultiplier tubes 7, 8 and 9, are respectively transmitted on lines 14, 15 and 16 to amplifiers 23, 24 and 25 of conventional design. The outputs from amplifiers 23, 24 and 25 are connected to the grids of cathode followers 26, 27 and 28, which transmit the amplified signals on lines 29, 30 and 31.

The lines 29, 30 and 31 are respectively connected to resistors 32, 33 and 34 which are connected to the anodes of compensator valves 35, 36, 37 the operation of which is described below, and lines 38, 39 and 40 respectively connect the anodes of the compensator valves 35, 36 and 37 to the three fixed contacts Y1, M1 and C1 of a first manually operable four-position switch 41 which forms a part of the correction means, and to the deflector means of an analysing cathode ray tube 42. Connection is made respectively with the contacts Y1, M1 and C1 when the yellow, magenta and cyan printers are to be produced, and the fourth fixed contact B1 of switch 41, which is contacted when the black printer is to be produced is connected by a mixer 43 to the three lines 38, 39 and 40.

The lines 29, 30 and 31 are also respectively connected through resistors 44, 45 and 46, FIGURE 5, to three of the fixed contacts Y2, M2 and C2 of a second manually-operable four-position switch 47. The fourth fixed contact B2 of the switch 47 is connected by a mixer 48 to the lines 29, 30 and 31. A meter 49 is connected to the movable contact of the switch 47 and to the movable contact of a third manually-operable four-position switch 50, and the four fixed contacts Y3, M3, C3 and B3 of the switch 50 are respectively connected to the movable contacts on potentiometers 51, 52, 53 and 54.

The potentiometers 51, 52, 53 and 54 are connected in parallel between two resistors 55 and 56 which are respectively connected to a source of H.T. potential and to earth. The first, second and third four-position switches 41, 47 and 50 are ganged together for simultaneous operation, and before operation of the apparatus to produce colour separation negatives the potentials on the cathodes of the cathode followers 26, 27 and 28 are balanced out under "no signal" conditions that is with the photomultiplier tubes 7, 8 and 9 not activated, by selectively setting the switches 41, 47 and 50 in each of the four positions thereof, and for each position of the switches, adjusting the potentiometer 51, 52, 53 or 54 appropriate to that position.

The deflector means of the analysing cathode ray tube 42 comprises two pairs of deflector plates 57, 58 and 59, 60, FIGURE 3, and the cathode ray tube is connected to a supply network, not shown, in known manner to energise the electron gun of the tube. The third photomultiplier tube 9 is connected through the amplifier 25, cathode follower 28 and lines 31 and 40 to a plate of each pair of plates, that is to plates 58 and 60 and the first and second photomultiplier tubes 7 and 8 are similarly connected by lines 38 and 39 to the two remaining plates 57 and 59 respectively.

There are thus transmitted to the deflector plates of the analysing cathode ray tube 42 at any instant three signals on lines 38, 39 and 40, representative respectively of the blue, green and red components of the colour of a small area on the original, and it will be understood that for a grey area on the original the amplitudes of the three signals are equal, the cathode ray beam in the tube 42 will not be deflected, and the spot of light which the beam produces on the face of the tube will be stationary in the centre of the face. This is represented in FIGURE 7, which illustrates diagrammatically a display on the face of the tube 42 and the relative positions of the plates 57, 58, 59 and 60. If, however, the amplitudes of the signals are not equal, the spot of light will take up a different position on the face of the tube, and for each possible colour of an area on the original, the spot of light will assume a definite position on the face of the tube 42. The positions on the face of the tube 42 corresponding to a red, blue, green, yellow, magenta and cyan area on the original are shown in FIG. 7. As the original is scanned by the scanning spot of light from the source 4, the spot of light on the face of the tube 42 will assume sequentially a series of positions.

In order to apply colour and tone correction to a colour separation photographic negative, the intensity of the scanning spot of light from the light source 4 is modulated by the appropriate colour and tone corrected modulating signal transmitted on line 17, and for the production of any one printer, for example the yellow printer, it is necessary to specify the colours in the original to which a colour and tone correction is to be applied. This is achieved by placing a selecting screen 61, FIG. 2, in front of the face of the analysing cathode ray tube 42, so that the spot of light on the face of the tube 42 is operable through the screen 61 to actuate a fourth photoelectric device shown as a photomultiplier tube 62, but which, if desired, can be a photo-transistor. The optical density of the screen 61 is predetermined for each area thereon so that the amount of light transmitted from the face of the analysing tube 42 to the cathode of the fourth photomultiplier tube 62 is determined by the position of the spot of light on the face of the tube 42 and by the optical density of the area on the screen 61 through which light from the spot on the face of the tube passes, so that the selecting screen 61 functions to select those colours to which a correction is to be applied in the production of a corrected colour separation photographic negative. A selecting screen 61 having a different optical density distribution is provided for use in the preparation of each printer.

An example of a selecting screen 61 for use in the production of the yellow printer is illustrated in FIG. 8. The central area 63 of the screen, which overlies the "grey" position on the face of tube 42, FIG. 7, is the least optically dense. The densest area 64 of the screen overlies the "yellow" position on the face of the tube 42, and the areas of the screen of intermediate optical density overlies the positions on the face of tube 42 corresponding to the colours which are to be corrected.

When a yellow area on the original is illuminated by the scanning spot a minimum light signal is transmitted to the fourth photomultiplier tube 62, FIG. 2. When a grey area on the original is illuminated a maximum light signal is transmitted to the tube 62, and when the colour of the area on the original which is illuminated is in the range blue-magenta-red, a light signal of intermediate strength is transmitted to the tube 62. Colours which fall within this range are those to which correction is to be applied in the production of the yellow printer. As the original is sequentially scanned, with the selecting screen 61 for the yellow printer in front of the tube 42, the output signal transmitted from the fourth photomultiplier tube 62 on line 65 will be a yellow colour signal.

The output from the fourth photomultiplier tube 62 on line 65 is connected to the cathode of the analysing cathode ray tube 42 by a negative feedback loop which ensures good stability and frequency response, and which comprises a first amplifier valve 66, a first potential divider consisting of resistors 67, 68 and 69, and a first cathode follower 70; connected in series. The grid of the cathode follower 70 is connected to a sliding contact on resistor 69 which is preset to determine the standing D.C. bias potential applied to the grid of cathode follower 70, and a sliding contact on resistor 67 is connected by a line 71 to the deflector means of a correction cathode ray tube 72.

The analysing cathode ray tube 42, selecting screen 61, photomultiplier tube 62, amplifier valve 66, cathode follower 70, and their associated circuits together form a colour analysing device which produces colour signals which are transmitted on line 71 to the correction means for conversion into modulating signals.

The correction means includes the correction cathode ray tube 72 which is also connected to a supply network, not shown, in known manner to energise the electron gun of the tube. The end of resistor 69 is connected to a negative E.H.T. potential and the cathode of the fourth photo-multiplier tube 62 and the grid of the analysing cathode ray tube 42 are connected together to a further negative E.H.T. potential on line 74. The anode of the fourth photomultiplier tube 62 is connected to earth through a load resistor, and when the cathode of the tube 62 is illuminated from the cathode ray tube 42 through the selecting screen 61, the anode of the tube 62 will go negative. The anode of the first amplifier valve 66 thus goes positive and a fraction of this positive-going signal is transmitted through the potential divider 67, 68, 69 and the first cathode follower 70 to the cathode of the analysing cathode ray tube 42. The intensity of the spot of light on the face of the analysing tube 42 is thus reduced by a small amount, and a state of balance is achieved in a normal feedback manner.

It will be seen that the two-dimensional display on the face of the analysing tube 42 has been obtained from an input having three variables, and in order to counter any ambiguities which might arise due to this, and in order to convert the colour signal into a colour and tone corrected modulating signal the correction cathode ray tube 72 is operable through a correction screen 75, the optical density of which is predetermined for each area thereon, to actuate a fifth photoelectric device shown as a photomultiplier tube 76, but which, if desired, may also be a photo-transistor. The form of a correction screen 75 will be described below, by way of example, with reference to FIGS. 10, 11 and 12.

The deflector means for the correction cathode ray tube is shown in FIGURE 4, and comprises two pairs of deflector plates 77, 78 and 79, 80. The plates 78 and 80 are connected in common and to earth, plate 77 is connected by the line 71 to the output from the fourth photoelectric device 62, and plate 79 is connected by a line 81 to the movable contact of the first four-position switch 41, so that the plate 79 can be connected selectively to the first, second, or third photo-multiplier tubes 7, 8 or 9, through one of the lines 38, 39 or 40, or simultaneously to all three photomultiplier tubes through the mixer 43.

The output from the fifth photomultiplier tube 76 is connected to the cathode of the correction cathode ray tube 72 by a negative feedback loop which ensures good stability and frequency response and which comprises a second amplifier valve 82, a second potential divider consisting of resistors 83, 84 and 85 and a second cathode follower 86. The standing D.C. bias potential on the grid of cathode follower 86 is determined by the position of the sliding contact on resistor 85.

The position of the spot of light on the face of the correction cathode ray tube 72 is determined by the amplitude of the colour signal on line 71 and the tone value of the signal which is selected by operation of switch 41 and which is transmitted on line 81. The optical density of the correction screen 75 is predetermined for each area thereon to give a required colour and tone correction and the tube 72, screen 75, photomultiplier tube 76, and the negative feedback loop operate in the same way as described with reference to the analysing cathode ray tube 42, the screen 61 and the fourth photomultiplier tube 62.

The correction cathode ray tube 72, screen 75, photomultiplier tube 76, amplifier valve 82, cathode follower 86 and their associated circuits together with the switch 41, form the correction means and the modulating signal transmitted on to line 17, which is connected to the variable contact on resistor 83, is the required colour and tone corrected modulating signal which is transmitted to the intensity modulator 6, FIGURE 1, which is illustrated in FIGURE 6.

The intensity modulator comprises a light valve 87, FIGURE 6, which may be for example a mirror galvanometer, one end of the coil of which is connected in known manner to the cathode of a driver tetrode valve 88. The control grid of the valve 88 is connected to the line 17, and the other end of the coil of the galvanometer 87 is connected to the sliding contact of a potentiometer 89 which is connected between a source of negative bias potential and earth. The sliding contact on resistor 83 is adjustable to vary the grid bias on the valve 88, and fine control of the amount of correction applied is possible by adjustment of the potentiometer 89 which varies the amount of negative feedback in the driver valve circuit.

The mirror galvanometer modifies the intensity of the scanning spot derived from the source of light 4, in response to the modulating signals on line 17 and so controls the amount of light incident sequentially on the photographic plate in the camera 2 which, when developed and fixed, gives a corrected colour separation photographic negative.

The production of a corrected colour separation photographic negative for the yellow printer will now be described. A blue filter is used with the camera 2, FIG. 1, and the switch 41, FIG. 2, is set in the Y1 position to connect line 81 to line 38. The selecting screen illustrated in FIG. 8 is placed in front of the face of the analysing cathode ray tube 42, and as stated above, is operable to select colours in the blue-magenta-red range for correction.

When a grey area on an original is illuminated by the scanning spot, a strong signal is transmitted from the fourth photomultiplier tube 62, and the positive swing of the anode potential of the first amplifier 66 causes the spot of light on the face of the correction cathode ray tube 72 to be deflected towards the left, as shown in FIG. 10, which represents diagrammatically the face of the correction cathode ray tube 72. The denser the grey spot on the original, that is the more nearly black, the weaker will be the signal on line 81, from the photomultiplier tube 7, FIG. 2, which is activated through the blue filter 10, and the spot on the face of the correction tube 72 will be deflected towards the bottom of the face, as indicated by the line D in FIG. 10. The line D corresponds to the complete grey scale of densities from white to black.

The areas of intermediate optical density of the selecting screen 61 overlie areas on the face of the analysing tube 42 which correspond to colours of the original in the blue-magneta-red range which require correction when the yellow printer negative is being produced. The apparatus is set up so that for these colours the spot of light on the face of the tube 72 will be centrally disposed, and for any one of these colours the scale of density of the colour from white to full saturation is represented by a line E, for example.

When the spot of light on the face of the analysing tube 42 is in the yellow position, a minimum signal is transmitted by the fourth photomultiplier tube 62, and the spot of light on the face of the correction tube 72 is deflected towards the right, as shown in FIG. 10 in which the line F represents the scale of density of yellow from white to full saturation.

The optical density of each area of the correction screen 75 is predetermined to give a required colour and tone correction, as illustrated graphically in FIG. 11 by plotting the density of colour of each area on the original against the optical density of the screen 75 for the three colours represented by lines D, E and F, FIG. 10. For the grey scale represented in FIG. 11 by line D1, when the colour is least dense, that is white, the correction screen 75 has maximum optical density, and when the colour has saturation density the screen 75 has a minimum optical density. The optical density gradient of the screen 75 along that part thereof which overlies the line D on the face of the tube 72 is therefore such as to give a full range of under-colour removal for the grey scale.

The optical density gradients of the parts of the correction screen 75 which overlie the lines E and F on the face of tube 72, FIG. 10, are represented by lines E1 and F1, FIG. 11. The line E1 represents one of the colours in the blue-magenta-red range which requires some correction, and the optical density gradient of the screen 75 along the line E1 is appropriate to the required amount of correction. In the case of the line F1 which represents the printing colour, in this case yellow, the optical density of the correction screen 75, as shown by the line F1 is only sufficient to exercise a tone control and when the original is a transparency to give some contrast reduction, and no colour correction is applied. To produce corrected colour separation negatives for use with different printing colours, or different printing processes it is only necessary to manipulate the switch 41 and to change the selecting screen 61, substituting a selecting screen with a different optical density distribution, which selects the appropriate colours for correction.

The same correction screen 75 is used in the preparation of corrected negatives for the yellow, magenta and cyan printers, but for the production of a negative for the black printer a different correction screen 75 is used. The selecting screen 61 for the black printer is illustrated in FIG. 9, and has a central area 90 of minimum optical density and has a peripheral area 91 of maximum density. Therefore when a negative for the black printer is being prepared, only when an area of the original illuminated by the scanning spot is grey or a very weak colour, will a light signal be transmitted to the fourth photomultiplier tube 62, FIG. 2. Although, for the black printer, the grey scale will still correspond to the line D on the face of the tube 72, FIG. 10, a different correction screen 75 is required, and the optical density distribution of this correction screen is shown in the graphs of FIG. 12. In FIG. 12 the density of colour of an area on the original is plotted against the optical density of the correction screen 75, for the grey scale represented by line D2, and for colours represented by line F2.

It will be understood that the optical density of the correction screen 75 referred to above is continuously variable over the whole area of the screens, so that a required correction is obtainable depending on the position of the spot of light on the face of the correction tube 72, which is a function of the optical density of the selecting screen 61. The actual optical density distributions on screens 61 and 75 will depend on the printing process being used and the kind of original being scanned, which may be opaque or transparent.

The light signal transmitted through the correction screen 75 activates the fifth photomultiplier tube 76, and the output from the second amplifier 82 on line 17 is a colour and tone corrected modulating signal for transmission to the intensity modulator 6.

The determination of the optical density of adjoining areas on the screens 61 and 75 is affected by the overall feedback characteristics of the apparatus, since any modulating signal applied by the control means 13, FIG. 1, to the intensity modulator 6 alters the amplitudes of the signals from the photomultiplier tubes 7, 8 and 9, and consequently the positions of the spots of light on the faces of the analysing and correction cathode ray tubes 42 and 72, FIGURE 2.

To compensate for this feedback there are provided the three compensator valves 35, 36 and 37 the cathodes of which are connected to earth, and the grids of which are connected in common through a resistor 92 to line 17 on which the modulating signal is transmitted. If the modulating signal on line 17 is a positive-going signal which will increase the intensity of the scanning spot of light, then the potential on the grids of the valves 35, 36 and 37 will be positive-going, and the current flowing through the valves will increase. The voltage drop across resistors 32, 33 and 34 will increase, and the amplitudes of the signals on lines 38, 39 and 40 will be correspondingly decreased, thus compensating for the increase in the signals due to the increase in the intensity of the scanning spot, so that the spots of light on the faces of the cathode ray tubes 42 and 72 remain in substantially the same positions during the illumination of any particular area on the original.

With electro-mechanical intensity modulators, such as a vibrating diaphragm or a mirror galvanometer there is a certain time delay between the generation of a modulating signal on line 17, and the modulation of the intensity of the scanning spot by the intensity modulator 6. To allow for this time delay, the modulating signal is transmitted to the grids of the compensator valves 35, 36 and 37 through a delay circuit comprising the resistor 92, FIG. 2, and a condenser 93 and the time constant of this delay circuit is substantially equal to the time delay in the operation of the modulator 6.

A second embodiment of the invention for scanning transparent originals of the kind known as pure dye image transparencies, is shown in FIGURE 13. Pure dye image transparencies are non-light scattering and a ray of light which is incident normally on one side of the transparency will pass through it without any appreciable change of direction.

The scanning means comprises a scanning cathode ray tube 94 which is connected to a supply network, not shown, in known manner to energise the electron gun of the tube, and the grid 95 of which comprises the modulating means. A transparent original 1 is placed flat against the face of the tube to be photographed by a camera when it is sequentially scanned by a spot of substantially white light on the face of the tube. Light is transmitted directly from the original to the camera and the aperture of the camera is sufficiently small to give no appreciable increase in the effective spot size due to the original being separated from the scanning spot by the thickness of the cathode ray tube face; that is the camera is stopped down to allow only that part of the light which has not undergone any substantial refraction by the face of the tube to affect the photographic plate in the camera. Some of the light transmitted from the original is incident on a lens 96 and the light transmitted by the lens is deflected by a mirror 97 and focused on the photomultiplier tubes 7, 8 and 9, through a lens system 98 having a stop 99 which also has a small aperture for the reasons just stated. The spot of light on the face of the cathode ray tube 94 is, in known manner, made to form a raster on the face thereof by the action of two time base circuits, not shown, of any suitable known kind. Sequential light signals are transmitted from the original 1 through the filters 10, 11 and 12, to the photomultiplier tubes 7, 8 and 9 and signals representative of the primary colour components of the original are transmitted to the control means 13, which is described herein with reference to FIGURES 2, 3, 4, 5 and 6. Due to the thickness of the face of the cathode ray tube 94, the illuminated area of the transparency viewed by the camera 2 at any instant is adjacent to but different from the illuminated area viewed by the photomultiplier tubes 7, 8 and 9, as illustrated by the divergence of the two light beams 100 and 101 in FIG. 13. If the scanning spot is travelling in the direction of the arrow 5, the photomultiplier tubes will always receive light from an area on the transparency slightly in advance of the camera, so that the colour and tone corrected modulating signal on line 17 for an area on the original will always lead the exposure of a photographic plate in the camera 2 to light transmitted from that area. This time lead can be varied by adjusting the relative positions of the camera 2 and the lens 96 and can be used to compensate for any unwanted time delays in the electronic circuits of the control means 13. Modulating signals are transmitted from the control means 13 on the line 17 which is connected to the grid 95 of the scanning cathode ray tube 94 and is operable to modulate the intensity of the scanning spot to control the amount of light transmissible directly from the original 1 to a photographic plate in the camera 2. The modulating signal is also transmitted to a monitoring cathode ray tube, not shown, so that the amount of correction applied can be observed directly by the operator.

The cathode 102 of the scanning cathode ray tube 94 is connected to the sliding contact on potentiometer 103 which is connected to a source of negative bias potential by line 104, and to earth. The amount of correction applied to modulate the intensity of the spot of light is controllable by adjustment of the potentiometer 103.

Referring to FIGURE 14 a further embodiment of the apparatus for producing colour and tone corrected modulating signals is shown. A number of features of the apparatus illustrated in FIGURE 2 are retained, and light transmitted from an original passes through filters 10, 11 and 12 to activate the photomultiplier tubes 7, 8 and 9 as before.

The screen grids of the amplifiers 23, 24 and 25 are respectively connected to sliding contacts on resistors 105, 106 and 107 which are connected to the H.T. supply line for the amplifiers, and in order to equalise the potentials on the cathodes of the cathode followers 26, 27 and 28 under "no signal" conditions, as referred to above, the switch 41 is selectively set in each of the three positions Y1, M1 and C1 thereof, and the resistor contact 105, 106 or 107 appropriate to each position is adjusted to give identical readings on the meter 49.

In view of the large range of colour density of the average coloured original, it is desirable in some cases to convert the electrical signals originating from the first, second and third photomultiplier tubes 7, 8 and 9 into logarithmic form. To achieve this the amplifiers 23, 24 and 25 may be operated on the bottom bend of their characteristic curves, so that the signals transmitted on lines 29, 30 and 31, FIG. 2, represent the logarithm of the signal from the photomultiplier tubes 7, 8 and 9. However, it is preferred to retain the amplifiers 23, 24 and 25 purely as linear amplifiers and to provide logarithm deriving circuits which are operable to convert the output signals from the photomultiplier tubes into logarithmic form.

The line 29, FIGURE 14, which carries the output from the photomultiplier tube 7, is connected to line 38, and thence to the plate 57 of the deflector means for the analysing cathode ray tube 42, by a logarithm deriving circuit comprising a resistor 108 connected to the line 29 and a diode 109 connected in series with the resistor 108 and to a line 110 which is connected between a sliding contact on a bias resistor 111 and the meter 49. The bias resistor 111 forms with a further resistor 112 a potential divider connected between the H.T. supply line and earth.

The junction of the resistor 108 and the diode 109 is connected to the control grid of an amplifier triode valve 113 the anode of which is connected to line 38. As is well understood the characteristic of a series combination of a resistor and a diode can be used to produce a logarithmic signal, and the signal on line 38 represents the logarithm of the signal on line 29.

In order to generate an accurate logarithmic signal the standing potential on the control grid of the triode valve 113 must be equal to the potential on line 29 under "no signal" conditions. This is achieved by adjustment of the sliding contact on the resistor 111, following adjustment of the contacts on the resistors 105, 106 and 107, until the meter 49 gives a zero reading for each of the positions of the four-position switch 41.

Similarly, a logarithm deriving circuit comprising a resistor 114, a diode 115 and a triode valve 116 connects line 30 to line 39, and a logarithm deriving circuit comprising a resistor 117, a diode 118 and a triode valve 119 connects line 31 to line 40. Line 39 is connected to the plate 59 of the deflector means of the analysing tube 42, and the line 40 is connected to both plates 58 and 60 of the deflector means.

The cathodes of the triode valves 113, 116 and 119 are connected in common and have a common cathode load 120 which is connected to earth. The cathodes are also connected to the H.T. supply line through a resistor, so that a positive bias is maintained on the cathodes.

The logarithmic signals on lines 38, 39 and 40 are each a function of the brightness of the scanning spot of light which scans the original, and of the density of one of the primary colour components of the original. By the action of the deflector means of the analysing tube 42 the logarithm signals are subtracted from each other so that the position of the spot of light on the face of the tube 42 is determined not by the difference between electrical signals as with the apparatus of FIGURE 2, but by the ratio of the output electrical signals originating from the photomultiplier tubes 7, 8 and 9. Since the components of each of the logarithmic signals on lines 38, 39 and 40 determined by the intensity or brightness of the scanning spot are equal they will cancel out in the tube 42, so that the position of the spot of light on the face of the tube 42 is dependent only on the hue and density of the colour of the area of the original being illuminated by the scanning spot.

Thus the output from the fourth photomultiplier tube 62 on line 65 is a function only of the hue and colour density of the area of the original being illuminated. The line 65 is connected to one control grid of a first double triode push-pull amplifier 121 and the other control grid of this amplifier is connected to a sliding contact on a resistor 122 which provides a standing bias potential on that grid. Outputs from the two anodes of the amplifier 121 are taken on lines 123 and 124 which are respectively connected to plates 77 and 78 which comprise one pair of plates of the deflector means of the correction cathode ray tube 72. The line 123 is connected by a series resistor chain 125 and 126 to the line 74 which is for connection to a source of negative E.H.T. potential. A sliding contact on resistor 126 is connected to the cathode of the analysing cathode ray tube 42, the control grid of which is connected to the line 74. Negative feedback is thus provided from the fourth photomultiplier tube 62 back to the analysing tube 42.

The plates 79 and 80, being the other pair of plates of the deflector means of the correction cathode ray tube 72, are connected to outputs from a second double triode push-pull amplifier 127. That is plate 79 is connected by a line 128 to one anode of the amplifier and plate 80 is connected by a line 129 to the other anode. One grid of the amplifier 127 is connected to a sliding contact on a resistor 130 to provide a standing bias potential on that grid, and the other grid is connected to the junction of a resistor 131 and a diode 132 which are connected in series between the movable contact of the four-position switch 41 and the line 110. The resistor 131 and diode 132 together form a logarithm deriving circuit so that the potentials applied to the plates 79 and 80 of the correction tube 72 are also in logarithmic form. This results in a more evenly spaced display on the face of the tube 72 so that tone correction by means of the correction screen 75 is facilitated.

Negative feedback is provided in the circuit of the correction cathode ray tube 72 by the connection of the cathode of the tube 72 to a sliding contact on a resistor 133 which is connected through another resistor 134 to one anode 135 of a driver amplifier double triode valve 136 which receives the output signal from the fifth photomultiplier tube 76 on line 137. The anode 135 is connected to the resistor 134 through a further resistor 138 which has a sliding contact connected to the other control grid of the amplifier 136. The cathode associated with this other control grid has connected thereto the intensity modulator 87 which may have the form described herein with reference to FIGURE 6.

Colour selection and colour and tone correction are respectively effected by means of the selecting screen 61 and the correction screen 75 co-operating with the analysing cathode ray tube 42 and the correction cathode ray tube 72 respectively in the same way as described herein with reference to FIGURES 7 and 12. And the colour and tone corrected modulating signal is produced on line 137 for amplification by the driver amplifier valve 136 and application to the intensity modulator 87.

A simplified version of the electronic apparatus for producing a colour and tone corrected modulating signal is shown in FIGURE 15 and is for use when the degree of tone correction required is small, that is for use in reproduction systems which possess an inherently good tone response. The correction cathode ray tube 72 and its associated circuits including the fifth photomultiplier tube 76 are no longer necessary, but the logarithm deriving circuits and analysing cathode ray tube 42 with its associated circuits as shown in FIGURE 14 are retained.

In this simplified circuit the anode of the fourth photomultiplier tube 62 is connected through a load resistor 139 to a source of negative bias potential by line 140. The anode is also connected by line 141 to the control grid of an amplifier valve 142 the anode of which is connected by resistors 125 and 126 back to the cathode of the analysing cathode ray tube 42 to provide the negative feedback loop.

The anode of the fourth photomultiplier tube 62 is also connected by a line 143 to the control grid of the driver valve 88 which is a tetrode valve.

The mixer 43 which mixes the signals on the lines 29, 30 and 31, as well as being connected to the fixed contacts B1 of the first four-position switch 41 is also connected to one end of the resistor 131 of the logarithm deriving circuit which comprises the resistor 131 and the diode 132. The output taken from the junction of the resistor 131 and the diode 132 is the logarithm of the comprehensive signal derived from the output signals from the first, second and third photomultiplier tubes 7, 8 and 9, and this logarithmic signal is fed to the control grid of an amplifier triode valve 144. The resistor 131, diode 132 and triode valve 144 together form part of a grey-scale correction means and an output from the anode of the valve 144 is connected to three fixed contacts Y2, M2 and C2 of a second four-position switch 145, the movable contact 146 of which is connected to the screen grid of the driver tetrode valve 88. The fourth fixed contact B2 of the switch 145 is connected through a resistor to the H.T. supply line. The first and second four-position switches 41 and 145 are ganged together for simultaneous operation.

Thus when producing corrected colour separation photographic negatives for the yellow, magenta and cyan printers the logarithmic comprehensive signal fed to the screen grid of the driver valve 88 is modified by the colour signal derived from the fourth photomultiplier tube 62 to produce a grey-scale correction signal, and when a negative for the black printer is being produced the contact 146 of the second switch 145 contacts the fourth fixed contact B2 and no signal is fed to the screen grid of the valve 88, an appropriate fixed potential being supplied to the screen grid by the connection thereof to the H.T. supply line through a resistor.

As described above with reference to FIGURE 14 a colour signal transmitted on line 143 from the photomultiplier tube 62 is dependent only on the hue and colour density of the original. Consider the scanning of grey areas on the original, that is the grey scale of the original; the driver valve 88 is normally biased to cut-off by a combination of a negative bias applied to the control grid thereof from line 140, and a minimum screen grid potential which is obtained when a maximum signal is received from the photomultiplier tubes 7, 8 and 9 corresponding to zero density of the original. As the scanning spot travels down the grey-scale from zero density towards black on the original the screen potential of the valve 88 rises and the current flowing through the valve 88 consequently increases giving an increase in the intensity of the scanning spot.

When scanning coloured areas on the original the colour signal on line 143 is thus combined with the grey-scale signal applied to the screen grid of the valve 88 and the desired modulating signal is developed in the cathode circuit of the valve 88 for application to the intensity modulator 87.

The analysing cathode ray tube 42 with its selecting screen 61 gives colour correction. A limited amount of tone correction is also possible with this apparatus by arranging for a variable density selecting screen 61 which in addition to selecting colours has some of the functions of the correction screen 75 of FIGURES 2 and 14. Further some tone correction is possible by predetermining the form of the signal applied to the screen grid of the driver valve 88. In the particular embodiment of FIGURE 15 there is shown a logarithm deriving circuit for determining the form of this signal, but it will be appreciated that if desired this signal may have a form other than logarithmic and this form would be obtained by a particular construction of the grey-scale correction means.

It will be apparent that the circuits described above with reference to FIGURE 14 and to FIGURE 15 can be used either with the scanning means described with reference to FIGURE 1 or that described with reference to FIGURE 13 and that in the latter case the output signal from the driver valve 88 would be transmitted to the control grid 95 of the scanning cathode ray tube 94, FIGURE 13.

It will be understood that if, as mentioned above, a gas-filled arc discharge lamp is used as the light source 4 in the embodiment illustrated in FIGURE 1 no external modulating means such as that shown as an intensity modulator 6 will be required, as modulation can be effected by applying the modulating signal to an electrode of the lamp.

Although in the embodiment described with reference to FIGURE 13 a cathode ray tube has been shown for scanning a transparent original only, it will be apparent that corrected colour separation photographic negatives can also be produced from opaque originals using a scanning cathode ray tube by projecting a scanning raster on to an opaque original and activating the photomultiplier tubes 7, 8 and 9 with light reflected from the original.

It will also be apparent that the photographic colour reproduction apparatus described herein can be used for reproducing colour transparencies or for making corrected colour prints directly by exposing colour transparency material or photographic colour print material directly in the camera, giving three consecutive exposures each through the appropriate filter. The form of the selecting and correction screens 61 and 75 used is evaluated to give the required corrective responses for the photographic colour material being used.

I claim:

1. Photographic colour reproduction apparatus, comprising scanning means arranged to produce a spot of substantially white light and including means to cause said spot to scan a raster on a coloured original, a first, a second and a third photoelectric device each arranged to be responsive to a primary colour component of light transmitted from the original as a result of the scanning thereof, an analysing cathode ray tube having deflector means connected to the photoelectric devices and responsive to electrical signals originating as outputs from the photoelectric devices to determine a sequence of positions of a spot of light on the face of said tube according to the colours of areas of the original scanned in sequence, a fourth photoelectric device arranged to receive light from said spot of light and operable in response to said light to produce a colour signal, a selecting screen interposed between the analysing cathode ray tube and the fourth photoelectric device and having a predetermined optical density for each area thereof to select colours for correction by varying the intensity of the light received by the fourth photoelectric device according to the position of the spot of light on the face of the analysing tube, correction means connected to the fourth photoelectric device and operable to convert the colour signal into a colour and tone corrected modulating signal, and electrically actuated modulating means connected to the correction means and operable by said modulating signal to control the amount of light transmissible to a photographic plate.

2. Apparatus according to claim 1, wherein the deflector means for the analysing cathode ray tube comprises two pairs of deflector plates, one of said first, second and third photoelectric devices is connected to a plate of each pair of plates and the other two of said first, second and third photoelectric devices are respectively connected to the two other plates.

3. Apparatus according to claim 2, wherein the correction means includes a correction cathode ray tube whose deflector means is connected to the fourth photoelectric device and to said first, second and third photoelectric devices, said correction tube deflector means being responsive to a colour signal and to an output signal from said first, second and third photoelectric devices to determine the position of a spot of light on the face of the correction tube, a first four-position switch connected to the first, second and third photoelectric devices and to said deflector means and operable to connect selectively or simultaneously said first, second and third photoelectric devices to said deflector means, a fifth photoelectric device arranged to receive light from the spot of light on the face of the correction tube and operable thereby to produce the modulating signal, and a correction screen interposed between the correction tube and the fifth photoelectric device and having a predetermined optical density for each area thereon to apply a colour and tone correction by varying the intensity of the light received by the fifth photoelectric device according to the position of the spot of light on the face of the correction tube.

4. Apparatus according to claim 3, wherein the deflector means for the correction cathode ray tube comprises two pairs of deflector plates, two plates one from each pair, being connected in common, one of the other two plates being connected to the output from the fourth photoelectric device, and the remaining plate being connected to the movable contact of the first four-position switch, three fixed contacts of which are respectively connected to outputs from the first, second and third photoelectric devices, and the fourth fixed contact of which is connected to outputs from the first, second and third photoelectric devices.

5. Apparatus according to claim 4, wherein a first amplifier valve is connected to the output from the fourth photoelectric device, a first cathode follower is connected to the cathode of the analysing tube and a first potential divider connects the first amplifier valve to the first cathode follower to provide negative feedback to the analysing tube, and said one of the other two plates of the correction tube deflector means is connected to a sliding contact on said first potential divider.

6. Apparatus according to claim 5, wherein a second amplifier valve is connected to the output from the fifth photoelectric device, a second cathode follower is connected to the cathode of the correction tube and a second potential divider connects the second amplifier valve to the second cathode follower to provide negative feedback to the correction tube, and the modulating means is connected to a sliding contact on said second potential divider.

7. Photographic colour reproduction apparatus, comprising scanning means arranged to produce a spot of substantially white light and including means to cause said spot of light to scan a raster on a coloured original, electrically actuated modulating means connected to the scanning means and operable to vary the intensity of the scanning spot, a first, a second and a third photoelectric device having respectively associated therewith a blue, a green and a red filter and arranged to be responsive to light transmitted from the original as a result of the scanning thereof; an analysing cathode ray tube with associated deflector means, a resistor appropriate to each said photoelectric device and each connecting one of said photoelectric devices to the analysing tube deflector means which is responsive to electrical signals developed across said resistors to determine a sequence of positions of a spot of light on the face of said analysing tube according to the colours of areas of the original scanned in sequence, three compensator valves whose anodes are respectively connected to said resistors, whose cathodes are connected in common, and whose control grids are connected in common to the modulating means, a fourth photoelectric device arranged to receive light from said spot of light and operable thereby to produce a colour signal, a selecting screen interposed between the analysing cathode ray tube and the fourth photoelectric device and having a predetermined optical density for each area thereof to select colours for correction by varying the intensity of the light received by the fourth photoelectric device according to the position of the spot of light on the face of the analysing tube, and correction means connected to the fourth photoelectric device and to the modulating means and operable to convert the colour signal into a colour and tone corrected modulating signal for transmission to the modulating means.

8. Apparatus according to claim 7, wherein the compensator valves are triode valves, and the output from the correction means is connected to the control grids of the triode valves by a delay circuit which has a time constant substantially equal to the time delay in the operation of the modulating means.

9. Apparatus according to claim 8, wherein the correction means includes a correction cathode ray tube whose deflector means is connected to the fourth photoelectric device and to said first, second and third photoelectric devices, said correction tube deflector means being responsive to a colour signal and to an output signal from said first, second and third photoelectric devices to determine the position of a spot of light on the face of the correction tube, a first four-position switch connected to the first, second and third photoelectric devices and to said deflector means and operable to connect selectively or simultaneously said first, second and third photoelectric devices to said deflector means, a fifth photoelectric device arranged to receive light from the spot of light on the face of the correction tube and operable thereby to produce the modulating signal, and a correction screen interposed between the correction tube and the fifth photoelectric device and having a predetermined optical density for each area thereon to apply a colour and tone correction by varying the intensity of the light received by the fifth photoelectric device according to the position of the spot of light on the face of the correction tube.

10. Photoelectric colour reproduction apparatus comprising a scanning cathode ray tube arranged to produce a spot of substantially white light and including deflection means to cause said spot of light to scan a raster for the illumination of a coloured original, a first, a second and a third photoelectric device having respectively associated therewith a blue, a green and a red filter and arranged to be responsive to light transmitted from an original as a result of the scanning thereof, an analysing cathode ray tube having deflector means connected to the photoelectric devices and responsive to electric signals originating as outputs from said photoelectric devices to determine a sequence of positions of a spot of light on the face of said analysing tube according to the colours of areas of the original scanned in sequence, a fourth photoelectric device arranged to receive light from said spot of light and operable thereby to produce a colour signal, a selecting screen interposed between the analysing cathode ray tube and the fourth photoelectric device and having a predetermined optical density for each area thereof to select colours for correction by varying the intensity of the light received by the fourth photoelectric device according to the position of the spot of light on the face of the analysing tube, and correction means connected to the fourth photoelectrical device and to the control grid of the scanning tube and operable to convert the colour signal into a colour and tone corrected modulating signal for transmission to said control grid to vary the intensity of the scanning spot, whereby the amount of light transmitted from each area of the original to a photographic plate is controlled.

11. Apparatus according to claim 10, wherein the deflector means for the analysing cathode ray tube comprises two pairs of deflector plates, one of said first, second and third photoelectric devices is connected to a plate of each pair of plates and the other two of said first, second and third photoelectric devices are respectively connected to the two other plates.

12. Apparatus according to claim 11, wherein the correction means includes a driver valve the control grid of which is connected to the output from the fourth photoelectric device, and a grey-scale correction circuit connected to the outputs from the first, second and third photoelectric devices to receive a comprehensive signal representative of the colour density and the grey-scale of the original, said grey-scale correction circuit having an output connected to three fixed contacts of a second four-position switch the movable contact of which is connected to the screen grid of the driver valve to transmit thereto a grey-cale corrected comprehensive signal, whereby the colour signal output from the fourth photoelectric device is modified by the grey-scale corrected comprehensive signal to produce the modulating signal.

13. Apparatus according to claim 12, wherein the outputs from the first, second and third photoelectric devices are connected to the deflector means of the analysing cathode ray tube by logarithm deriving circuits, and the grey-scale correction circuit includes a logarithm deriving circuit, whereby the signals fed to the deflector means of the analysing cathode ray tube and to the screen grid of the driver valve are in logarithmic form.

14. Apparatus according to claim 13, wherein each logarithm deriving circuit includes a resistor and a diode connected in series therewith.

15. Apparatus according to claim 11, wherein the correction means includes a correction cathode ray tube whose deflector means is connected to the fourth photoelectric device and to said first, second and third photoelectric devices, said correction tube deflector means being responsive to a colour signal and to an output signal from said first, second and third photoelectric devices to determine the position of a spot of light on the face of the correction tube, a first four-position switch connected to the first, second and third photoelectric devices and to said deflector means and operable to connect selectively or simultaneously said first, second and third photoelectric devices to said deflector means, a fifth photoelectric device arranged to receive light from the spot of light on the face of the correction tube and operable thereby to produce the modulating signal, and a correction screen interposed between the correction tube and the fifth photoelectric device and having a predetermined optical density for each area thereon to apply a colour and tone correction by varying the intensity of the light received by the fifth photoelectric device according to the position of the spot of light on the face of the correction tube.

16. Apparatus according to claim 15, wherein the deflector means of the correction cathode ray tube, comprises two pairs of deflector plates, one pair of plates being connected to outputs from a first push-pull amplifier which is connected to the fourth photoelectric device, and the other pair of plates being connected to outputs from a second push-pull amplifier which is connected to the movable contact of the first four-position switch, three fixed contacts of which are respectively arranged to receive electrical signals originating as outputs from the first, second and third photoelectric devices, and the fourth fixed contact of which is arranged to receive electrical signals originating as outputs from the first, second and third photoelectric devices.

17. Apparatus according to claim 16, wherein the outputs from the first, second and third photoelectric devices are connected to the deflector means of the analysing cathode ray tube by logarithm deriving circuits, and the movable contact of the first four-position switch is connected to the second push-pull amplifier by a logarithm deriving circuit, said logarithm deriving circuits being operable to convert the output signals from the photoelectric devices into logarithmic form.

18. Apparatus according to claim 17, wherein each logarithm deriving circuit includes a resistor and a diode connected in series therewith.

19. Apparatus according to claim 15, wherein the deflector means for the correction cathode ray tube comprises two pairs of deflector plates, two plates one from each pair, being connected in common, one of the other two plates being connected to the output from the fourth photoelectric device, and the remaining plate being connected to the movable contact of the first four-position switch, three fixed contacts of which are respectively connected to outputs from the first, second and third photoelectric devices, and the fourth fixed contact of which is connected to outputs from the first, second and third photoelectric devices.

20. Apparatus according to claim 19, wherein a first amplifier valve is connected to the output from the fourth photoelectric device, a first cathode follower is connected to the cathode of the analysing tube and a first potential divider connects the first amplifier valve to the first cathode follower to provide negative feedback to the analysing tube, and said one of the other two plates of the correction tube deflector means is connected to a sliding contact on said first potential divider.

21. Apparatus according to claim 20, wherein a second amplifier valve is connected to the output from the fifth photoelectric device, a second cathode follower is connected to the cathode of the correction tube and a second potential divider connects the second amplifier valve to the second cathode follower to provide negative feedback to the correction tube, and the control grid of the scanning cathode ray tube is connected to a sliding contact on said second potential divider.

References Cited in the file of this patent

UNITED STATES PATENTS

| | | |
|---|---|---|
| 2,480,423 | Simmon | Aug. 30, 1949 |
| 2,627,547 | Bedford | Feb. 3, 1953 |
| 2,757,571 | Loughren | Aug. 7, 1956 |